(12) United States Patent
Hillery et al.

(10) Patent No.: US 8,401,507 B2
(45) Date of Patent: Mar. 19, 2013

(54) AUTOMATIC GAIN CONTROL FOR BEAMFORMED SIGNALS

(75) Inventors: William Hillery, Lafayette, IN (US); James Kepler, Buffalo Grove, IL (US); Mickael Batariere, Coignieres (FR)

(73) Assignee: Motorola Mobility LLC, Libertyville, IL (US)

( * ) Notice: Subject to any disclaimer, the term of this patent is extended or adjusted under 35 U.S.C. 154(b) by 1093 days.

(21) Appl. No.: 11/962,833

(22) Filed: Dec. 21, 2007

(65) Prior Publication Data

US 2009/0163167 A1    Jun. 25, 2009

(51) Int. Cl.
*H04B 1/10*    (2006.01)

(52) U.S. Cl. ............... 455/296; 455/240.1; 455/334; 375/345

(58) Field of Classification Search ............ 455/230, 455/232.1, 234.1, 234.2, 240, 296, 313, 323, 455/324, 334; 375/345
See application file for complete search history.

(56) References Cited

U.S. PATENT DOCUMENTS

| | | | |
|---|---|---|---|
| 5,276,685 A | 1/1994 | Kepler et al. | |
| 5,301,364 A | 4/1994 | Arens et al. | |
| 6,850,736 B2 * | 2/2005 | McCune, Jr. | 455/67.13 |
| 7,027,788 B2 * | 4/2006 | Walley | 455/226.2 |
| 7,046,976 B2 | 5/2006 | Le Naour et al. | |
| 7,181,178 B2 * | 2/2007 | Chow | 455/127.2 |
| 7,606,329 B2 * | 10/2009 | Yamauchi | 375/316 |
| 7,653,121 B2 * | 1/2010 | Muranaka et al. | 375/142 |
| 7,676,206 B2 * | 3/2010 | Ragan et al. | 455/232.1 |
| 2003/0143968 A1 * | 7/2003 | Iwata et al. | 455/240.1 |
| 2003/0194029 A1 * | 10/2003 | Heinonen et al. | 375/345 |
| 2003/0224813 A1 * | 12/2003 | Lehtinen et al. | 455/513 |
| 2006/0034401 A1 | 2/2006 | Cho et al. | |
| 2007/0010224 A1 * | 1/2007 | Shi | 455/241.1 |

* cited by examiner

*Primary Examiner* — Nhan Le

(57) ABSTRACT

A method of selecting an RF gain of an automatic gain control amplifier includes the steps of measuring a strength of a received signal, the signal reliable and consistent power characteristics, and then measuring an interference level of the received signal, and determining either a target output power level or a target output interference power level based on a ratio of the measured signal strength to the measured interference level. The method also includes determining a gain that, when applied to an incoming signal, will produce a corresponding one of the determined target output power level and the determined target output interference power level.

18 Claims, 6 Drawing Sheets

AUTOMATIC GAIN CONTROL FOR BEAMFORMED SIGNALS

FIELD OF THE INVENTION

This invention relates in general to wireless communication, and more particularly, to automatic gain control in wireless communication systems employing closed loop transmission diversity, known as "beamforming."

BACKGROUND OF THE INVENTION

A typical receiver 100 is composed of three general elements, as shown in FIG. 1. These elements are: 1) the radio frequency (RF) section 102 (often implemented with a chipset) which converts the RF signal into an intermediate frequency (IF), or baseband signal; 2) the analog-to-digital converter (ADC) 104 to digitize the signal; and 3) the digital portion 106 of the receiver 100 that implements receiver processing algorithms, such as channel estimation, equalization, decoding, signal-to-interference-plus-noise-ratio (SINR) estimation and automatic gain control (AGC).

Each element 102, 104, and 106 is configured so that an overall maximum carrier-to-interference ratio (C/I) requirement (e.g., 33 dB) is achieved when all the communication impairments are taken into account. Here, C refers to the desired signal power and I is the interference power due to all the hardware impairments. The maximum C/I requirement is chosen to achieve some adequate level of performance at the most aggressive modulation and coding scheme (MCS), such as R=¾ 64-QAM (Quadrature Amplitude Modulation), under certain channel conditions.

A conventional automatic gain control (AGC) algorithm tries to maintain a constant average power into the ADC 104 while using a gain distribution in the RF line-up that maximizes the overall C/I performance. This constant average power level is referred to as the "target" level. The conventional AGC, shown as a partial block schematic diagram in FIG. 10, maintains this constant power by periodically measuring the received signal strength (RSS) of the downlink (DL) at times where the DL signal is present and has reliable and consistent power characteristics. These measurements are averaged over time and the result is used to periodically update the receiver gain settings (usually once per frame). For example, in a system which implements the OFDMA physical layer in the IEEE 802.16e standard, the base station always transmits the preamble at a constant power so the preamble can be used for AGC purposes.

The conventional AGC works well when the power measurements are made over a signal that is transmitted in a manner known by the receiver. However, some systems employ multiple transmission techniques in a single frame, some of which are not known at the receiver. Some of these techniques vary the power level received at the mobile device. Additional effort must be taken at the mobile device to adequately accommodate such signals. For example, in an 802.16e system that employs downlink (DL) closed loop transmit beamforming (TxAA), the mobile device's AGC 108 sets the receiver gain based on the preamble transmission, which is the only part of the DL portion of the frame that is guaranteed to be present. When instructed, the mobile device transmits a sounding waveform to the base station at the end of the uplink (UL) portion of the frame. The base station estimates the channel from the received sounding waveform and uses the result to formulate the appropriate antenna weights to "beamform" the next DL data transmission to that mobile device.

Since the channel changes over time, the beamformed transmission must happen as soon as possible after the sounding transmission for optimal performance. Therefore, the best place to put the TxAA "zone" is right after the UL and DL maps. If a conventional AGC is used and the mobile is given a TxAA allocation that spans the entire frequency range of the channel, the mobile will see an IF (or baseband) power rise of approximately $10 \log(N_{ANT})$ dB in the TxAA portion of the frame, where $N_{ANT}$ is the number of elements in the base antenna array. If only a portion of the bandwidth is allocated to the mobile device, then the power rise may not be as great as that given in this equation. For an eight-element base antenna array, the power rise can be as much as 9 dB. However, if this power rise is not accounted for, the DL performance will be degraded by clipping within the ADC 104 and added inter-modulation distortion from the RF portion of the receiver. In this case, applying TxAA techniques will degrade system performance instead of improving it. This point is illustrated by the following formulas:

$$I = I_{OC} + I_{IM} + I_{RF} + N + Q$$

$$S_{IF} = N_{USED}(C + I - Q)$$

where:
I is the total interference on the digital signal as seen in one subcarrier;
$I_{OC}$ is the interference from other cells as seen in one subcarrier;
$I_{IM}$ is the inter-modulation interference from the RF receiver (which is a function of the total RF signal power ($S_{RF}$) and the total gain in the receiver (G)) as seen in one subcarrier;
$I_{RF}$ is the interference from other RF impairments such as phase noise and reference spurs (as seen in one subcarrier);
Q is the ADC 104 quantization noise in one subcarrier;
N is the thermal noise seen at IF in one subcarrier;
$N_{USED}$ is the number of subcarriers that are used;
$S_{IF}$ is the total IF signal power; and
C is the desired signal power at IF in one subcarrier.

The signal-to-interference-plus-noise ratio (SINR) per subcarrier of the digitized signal is SINR=C/I.

FIG. 2 shows an example of the conventional AGC operating in an 802.16e system where DL beamforming techniques are employed during part of the frame. This is a strong signal case where the performance is limited by interference from other cells, $I_{oc}$, rather than the thermal noise, N. $I_{RF}$ is not included here because the inter-modulation distortion, $I_{IM}$, is expected to be the dominant factor. This figure shows the relative power levels versus time of the various signal components as seen by the ADC 104. As per the 802.16e specification, the occupied preamble subcarriers are boosted by 9 dB as indicated by the initial level of C. Since every other cell is also boosting their preamble power, $I_{oc}$ is increased by 9 dB during that portion of the frame. After the preamble, C and $I_{oc}$ drop by 9 dB for the map portion of the frame. However, since only ⅓ of the preamble subcarriers are used, $S_{IF}$ drops by only ~4 dB and, thus, the inter-modulation, $I_{IM}$, drops by 12 dB. During the TxAA portion of the frame, C increases by a 9 dB beamforming gain giving the desired increase in signal power but $I_{IM}$ increases by 27 dB. After the TxAA portion of the frame, C drops by 9 dB and $I_{IM}$ drops by 27 dB. The total interference, I, is shown in the figure as a dotted line. For clarity, the dotted line is slightly separated from the other curves in both time and amplitude. The vertical separation between the C and I curves indicates the SINR that the mobile sees. As shown in the figure, there is no SINR benefit for the TxAA portion of the frame over the non-TxAA portion of the frame. To make matters worse, the increased level of $S_{IF}$ during the TxAA portion of the frame reduces the ADC 104 headroom that is required to handle the signal's peak-to-average power ratio (PAPR), which means the signal will clip much more often. This will produce performance degradation due to the resultant signal distortion.

Therefore, a need exists to overcome the problems with the prior art as discussed above.

SUMMARY OF THE INVENTION

A method of selecting an RF gain of an automatic gain control amplifier, in accordance with an embodiment of the present invention includes measuring a strength of a signal received at a receiver, the signal having reliable and consistent power characteristics; measuring an interference level of the received signal; and determining either a target output power level or a target output interference power level based on a ratio of the measured signal strength to the measured interference level; and determining a gain that, when applied to an incoming signal, will produce a corresponding one of: the determined target output power level; and the determined target output interference power level.

In accordance with another feature of the present invention, the target output power level determining step comprises setting the target output power level to a first value when the measured signal strength divided by the measured interference level falls below a first threshold value and setting the target output power level to a second value when the measured signal strength divided by the measured interference level exceeds a second threshold value, wherein the first value is less than the second value.

In accordance with a yet another feature, the present invention includes determining a continuous transition slope between the first value and the second value by the formula $(S_{High}-S_{Low})/((C/I)_{High}-(C/I)_{Low})$, where $S_{High}$ is the target output power level when the ratio of the measured signal strength to the measured interference level exceeds the second threshold value, $S_{Low}$ is the target output power level when the ratio of the measured signal strength to the measured interference level is less than the first threshold value, $(C/I)_{High}$ being the second threshold value, and $(C/I)_{Low}$ being the first threshold value.

In accordance with a further feature of the present invention, the target interference output power level determining step includes setting the target interference output power level to a first value when the measured signal strength divided by the measured interference level falls below a first threshold value and setting the target interference output power level to a second value when the measured signal strength divided by the measured interference level exceeds a second threshold value, wherein the first value is greater than the second value.

In accordance with a yet another feature, the present invention includes determining a continuous transition slope between the first value and the second value by the formula $(I_{High}-I_{Low})/((C/I)_{High}-(C/I)_{Low})$, where $I_{High}$ is the target interference power output level when the ratio of the measured signal strength to the measured interference level exceeds the second threshold value, $I_{Low}$ is the target interference power output level when the ratio of the measured signal strength to the measured interference level is less than a first threshold value, $(C/I)_{High}$ being the second threshold value, and $(C/I)_{Low}$ being the first threshold value.

In accordance with an additional feature, the present invention includes providing the automatic gain control amplifier with an RF receiver, an analog-to-digital converter communicatively coupled with and disposed downstream from the RF receiver, and a digital receiver communicatively coupled with and disposed downstream from the analog-to-digital converter, measuring the signal strength at the output of the analog-to-digital converter, and measuring the interference level at the output of the analog-to-digital converter.

BRIEF DESCRIPTION OF THE DRAWINGS

The accompanying figures, where like reference numerals refer to identical or functionally similar elements throughout the separate views, and which together with the detailed description below are incorporated in and form part of the specification, serve to further illustrate various embodiments and to explain various principles and advantages all in accordance with the present invention.

DETAILED DESCRIPTION

Figure 1:
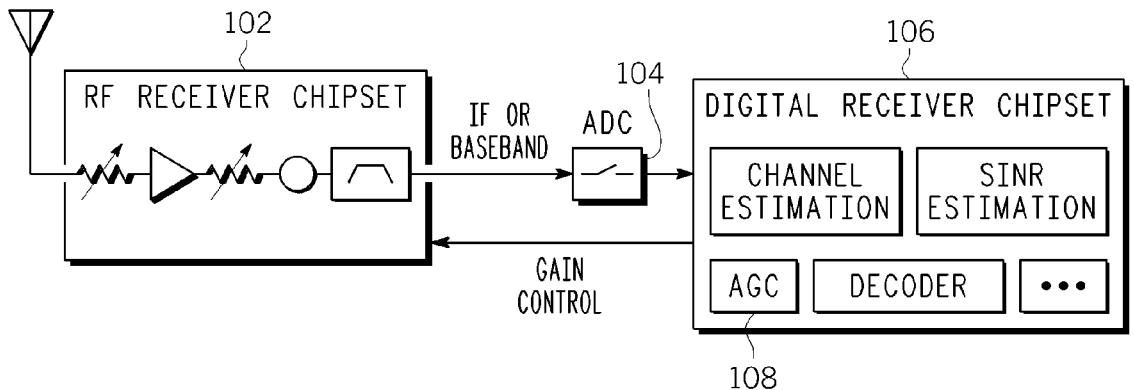
FIG. 1 is a schematic and block circuit diagram of a receiver, according to an embodiment of the present invention.
Figure 2:
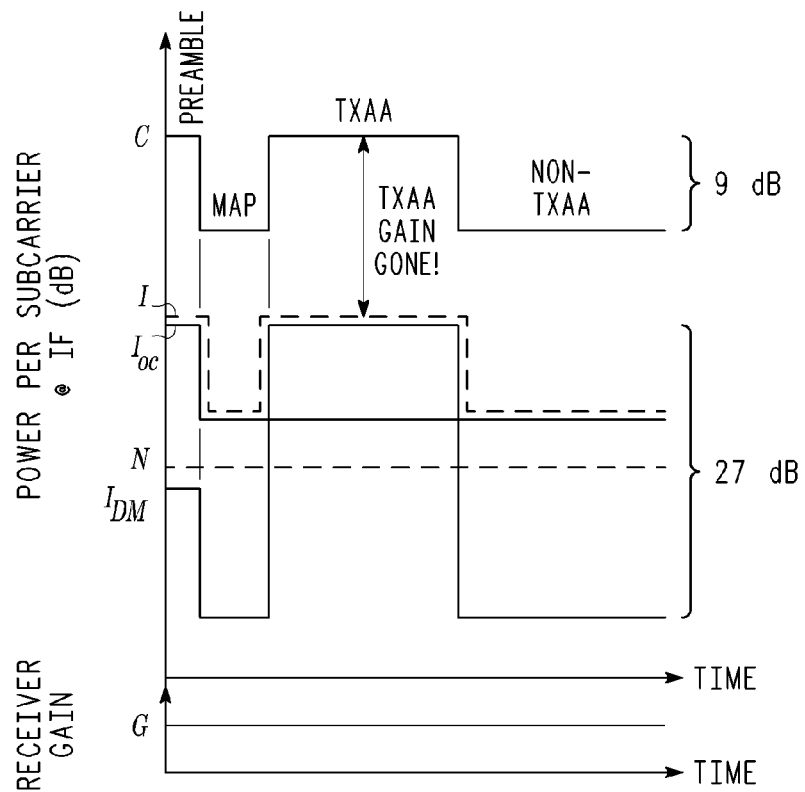
FIG. 2 is a graph of a conventional AGC operating in an 802.16e system where DL beamforming techniques are employed during part of the frame.

As required, detailed embodiments of the present invention are disclosed herein: however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term "plurality", as used herein, is defined as two or more than two. The term "another", as used herein, is defined as at least a second or more. The terms "including"

and/or "having", as used herein, are defined as comprising (i.e., open language). The term "coupled", as used herein, is defined as connected, although not necessarily directly, and not necessarily mechanically. The term "upstream," as used herein, is a point in a circuit closer to an input than the point to which it is referenced. The term "downstream," as used herein, is a point in a circuit closer to an output than the point to which it is referenced.

One method of increasing the efficiency of a link between a mobile unit and a base station serving that mobile unit is to broadcast information to a target subscriber unit using a transmit antenna diversity system. A transmit antenna diversity system allows the transmitted signal to be beamformed so that a narrower, more focused beam is transmitted to the user. Antenna beamforming reduces multipath fading of the transmitted signal and interference with non-targeted users since the beam is more narrowly focused.

One method of antenna beamforming involves separately weighting the signal transmitted by each element of an array of antenna elements. If the elements of the antenna array are weighted and phased appropriately, the signals broadcast from these elements will add constructively at the receiver of a target subscriber unit. When this occurs, the power at the targeted unit's receiver will increase by a factor that may be as large as the number of antennas used at the transmitter. In an Orthogonal Frequency Division Multiple Access (OFDMA) system, such as IEEE 802.16, the power increase will be smaller if the receiver's allocation covers only a portion of the signal bandwidth. When a beamformed allocation is not signaled prior to being transmitted (as in IEEE 802.16), the receiver cannot adjust the RF gain in anticipation of the beamformed signal. A conventional AGC must accommodate the possibility of increased received power by decreasing its target power by the maximum possible power increase. This expands the required dynamic range at the input to the ADC 104 by the same amount. As a result, the ADC 104 requires finer resolution and the linearity range of the RF section must be expanded, both of which are costly.

The presently inventive AGC approach makes the assumption that a TxAA allocation will not be directed to a given receiver when its C/I is high. This assumption presumes that the receiver has the capability of feeding back a signal quality indicator (e.g., C/I) to the transmitter. This capability exists in the IEEE 802.16 specification. When the C/I is low, the entire dynamic range of the ADC 104 is not required. In this case, the excess dynamic range can be utilized to accommodate the power increase which would occur when a TxAA allocation is sent to the receiver. This may be done by reducing the target power. When the C/I is high, no increase in dynamic range is required because a TxAA allocation will not be sent in this case. The target power can now be set as high as in the conventional AGC. Therefore, it is desirable to set the target power as a function of the measured C/I. In an IEEE 802.16 OFDMA system, the per subcarrier C/I is used because it is directly related to the ability to detect the individual modulation symbols.

The present invention provides two embodiments for implementing an AGC algorithm. In a first embodiment, the conventional AGC is modified and the target is applied to the total power. The power may be measured on any part of the signal with reliable and consistent power characteristics That is, the power is measured on a part where the signal is transmitted in a known and constant manner (not beamformed, for example) and over a time period where the signal is known to be present. On this part of the signal, the receiver can make a reliable power measurement which is consistent enough to use the power measurement to set an AGC gain, i.e., a multiplication factor. For IEEE 802.16, the total preamble power is used. This method will be referred to as the power-based AGC method. The preamble power per subcarrier could also be used if the target is adjusted appropriately. In other words, the target formula can be adjusted to get an equivalent operating point if the per subcarrier power is used rather than total power.

Figure 3:
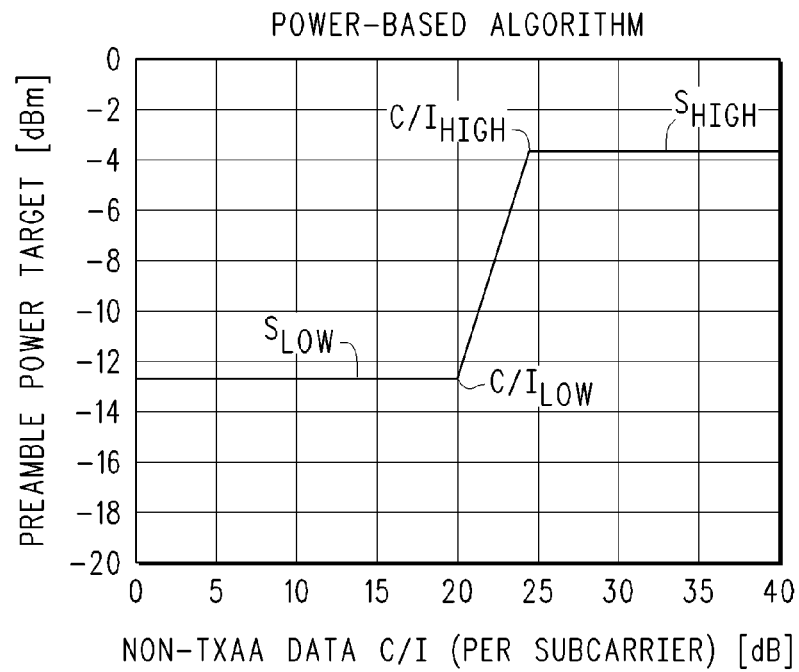
FIG. 3 is a graph showing variations in the target as a function of non-beamformed C/I data, according to an embodiment of the present invention.

The variation in the target as a function of the C/I can have many different functional forms which are all within the scope of the invention. One exemplary useful form is:

$$S_{Target} = \begin{cases} S_{Low} & (C/I) < (C/I)_{Low} \\ S_{High} & (C/I) \geq (C/I)_{High} \\ S_{Low} + m_P((C/I)-(C/I)_{Low}) & (C/I)_{Low} \leq (C/I) < (C/I)_{High} \end{cases}$$

where $S_{Target}$ is the target preamble power at the ADC 104 input (in dBm), $S_{Low}$ is the target at low C/I (dBm), $S_{High}$ is the target at high C/I (dBm), $(C/I)_{Low}$ is a threshold which defines the region of low C/I (dB), $(C/I)_{High}$ is a threshold which defines the region of high C/I (dB), and $$m_P = \frac{S_{High} - S_{Low}}{(C/I)_{High} - (C/I)_{Low}}$$

is the slope of the transition region between $(C/I)_{Low}$ and $(C/I)_{High}$ (in dB/dB). A plot of the target is shown in FIG. 3 for $(C/I)_{Low}$=20 dB, $(C/I)_{High}$=24.5 dB, $S_{Low}$=−12.7 dBm, and $S_{High}$=−3.7 dBm ($m_p$=2 dB/dB). It is desirable that the target be a continuous function of C/I to prevent large gain changes from frame to frame when the C/I is near the threshold. The thresholds can be predefined to any appropriate value or set dynamically by any appropriate means.

In this particular implementation, the C/I is the per subcarrier C/I value based on preamble measurements, $(C/I)_{Preamble}$, but converted to the same scale as non-beamformed data $(C/I)_{Data}$. In other words, the input to the target function is $(C/I)_{Data}$, which is obtained from preamble measurements which yield $(C/I)_{Preamble}$. The relationship between $(C/I)_{Preamble}$ and $(C/I)_{Data}$ can be made explicit by first assuming that the per subcarrier interference power is the same in the preamble and the non-beamformed data. While this is not necessarily true, it is a reasonable approximation for the purposes of AGC. The target function could use $(C/I)_{Preamble}$ directly since the relationship between $(C/I)_{Data}$ and $(C/I)_{Preamble}$ is straightforward. However, the thresholds in the target formula would need to be adjusted to account for the change. With other signals (i.e., not 802.16) other (C/I) measures might be appropriate.

In addition, there is a known relationship between the per subcarrier power in the preamble and the per subcarrier power on non-beamformed data subcarriers. In IEEE 802.16, this relationship is expressed (in dB) as:

$$C_{Data} = C_{Preamble} - B_{Preamble},$$

where $B_{Preamble}$ is the amount by which the preamble power is boosted over the data. In IEEE 802.16, $B_{Preamble}$=9.03 dB. Therefore, the C/I power value of the non-beamformed data subcarriers can be found by the formula:

$$(C/I)_{Data} = (C/I)_{Preamble} - B_{Preamble}$$

Power and interference measurements may be performed by any measuring device or technique that is able to determine power values. One such device is an instrument normally known as a power meter.

Figure 4:
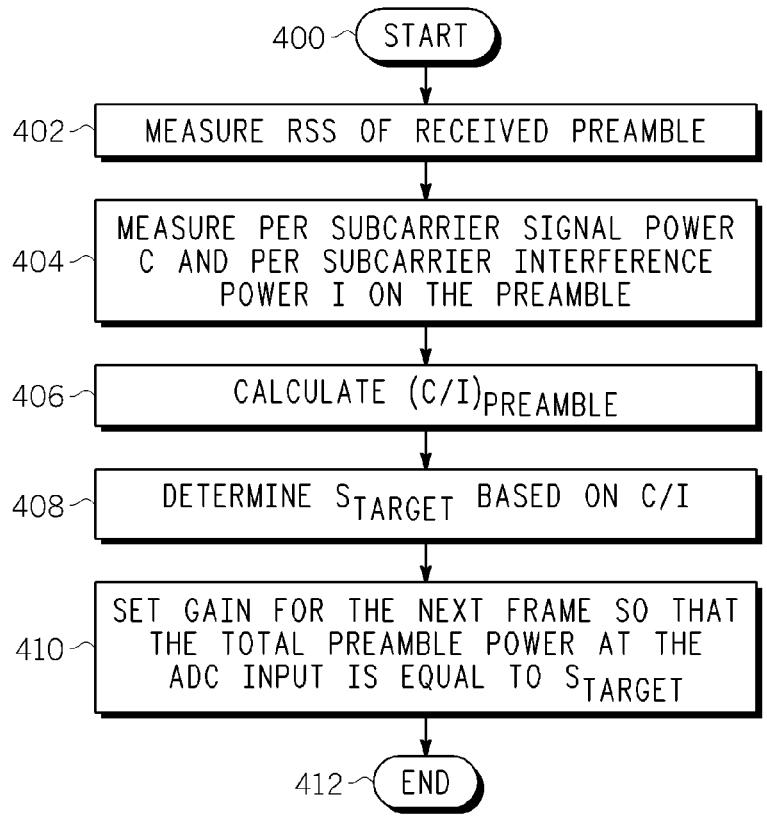
FIG. 4 is a process flow diagram of a power-based AGC method, according to an embodiment of the present invention.
Figure 11:
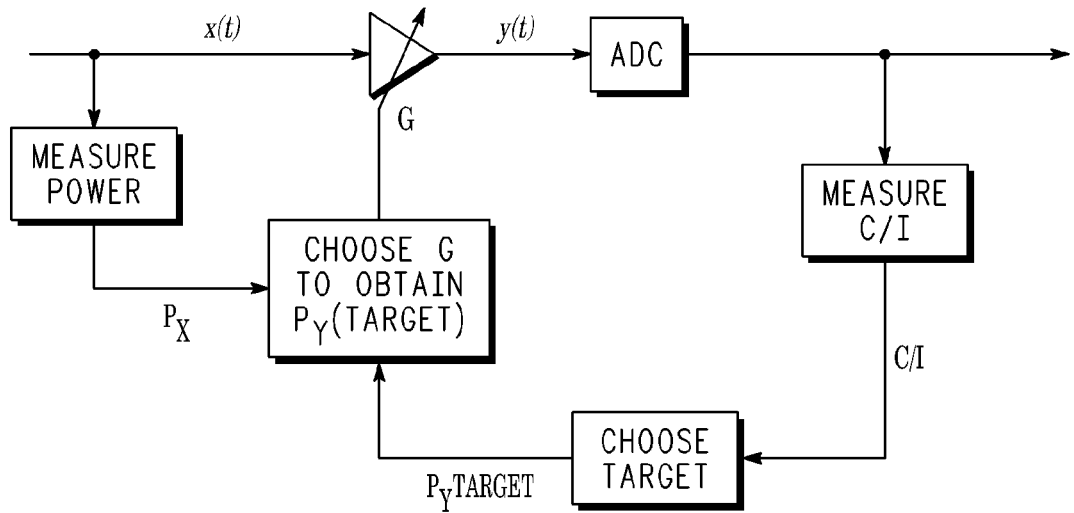
FIG. 11 is a partial block schematic diagram illustrating a power-based AGC process flow.

FIGS. 4 and 11 show a process flow of the power-based AGC method according to a first embodiment of the present invention. The flow starts at step 400 and moves directly to step 402, where the signal strength (RSS) of the received preamble is measured. The RSS is the total preamble power at the input to the RF section 102. Normally, this measurement is made in the hardware of the RF receiver chipset 102. The measurement may be stored and averaged over several frames. In all embodiments of the present invention where quantities can be averaged over several frames, the averaging can be simple (sum and divide by the number of measurements) or it can be performed using an averaging filter (for example, a simple single-pole infinite impulse response filter)

Next, in step 404, the per subcarrier signal power C and per subcarrier interference power I on the preamble are measured at the output of the ADC 104. Normally, these measurements are made mathematically in the digital receiver chipset 106. In step 406, the system calculates the per subcarrier C/I, $(C/I)_{Preamble}$, and scales it to the non-beamformed data value, $(C/I)_{Data}$, at the output of the ADC 104. This value may be stored and averaged over several frames. In step 408, $S_{Target}$ is found based on the per subcarrier C/I using, for example, the formula for $S_{Target}$ above. $S_{Target}$ can be found based on an average per subcarrier C/I or a single C/I value. Other ways of deriving $S_{Target}$ can also be used. In a following step, 410, the gain (for the next frame) is set so that the total preamble power at the ADC 104 input is equal to $S_{Target}$. That is, the gain $G_{dB}$ in dB is found so that $RSS_{dBm}+G_{dB}=S_{Target}$, where $RSS_{dBm}$ is the (average) received signal strength expressed in dBm. The flow ends at step 412.

According to a second embodiment of the present invention, the targeted power, $I_{Target}$, is the per subcarrier interference power, which is assumed to be relatively constant across the entire frame—preamble, non-beamformed data, and beamformed data. The total interference power could also be used with appropriate adjustments to the target. With other signals (i.e., not 802.16), other interference measures may be appropriate. As in the first embodiment, a single gain is used on each downlink subframe to determine adequate gain control. The invention is useful to set the RF gain level to achieve a target per subcarrier interference power that is some multiplication factor above the per subcarrier quantization noise, making allowances for other systematic contributions to interference such as transmitter impairments, phase noise, and intermodulation distortion. The variation in the target with C/I is designed to make the best use of the available dynamic range based on when a TxAA allocation might be expected. This AGC-determining technique can be referred to as an "interference-based" AGC method.

As in the power-based method of the first embodiment, the variation in the target as a function of C/I can have various functional forms. The specific form described here is the same as in the power-based algorithm, but modified to focus on the per subcarrier interference power:

$$I_{Target} = \begin{cases} I_{Low} & (C/I) < (C/I)_{Low} \\ I_{High} & (C/I) \geq (C/I)_{High} \\ I_{Low} + m_I((C/I) - (C/I)_{Low}) & (C/I)_{Low} \leq (C/I) < (C/I)_{High} \end{cases}$$

Figure 5:
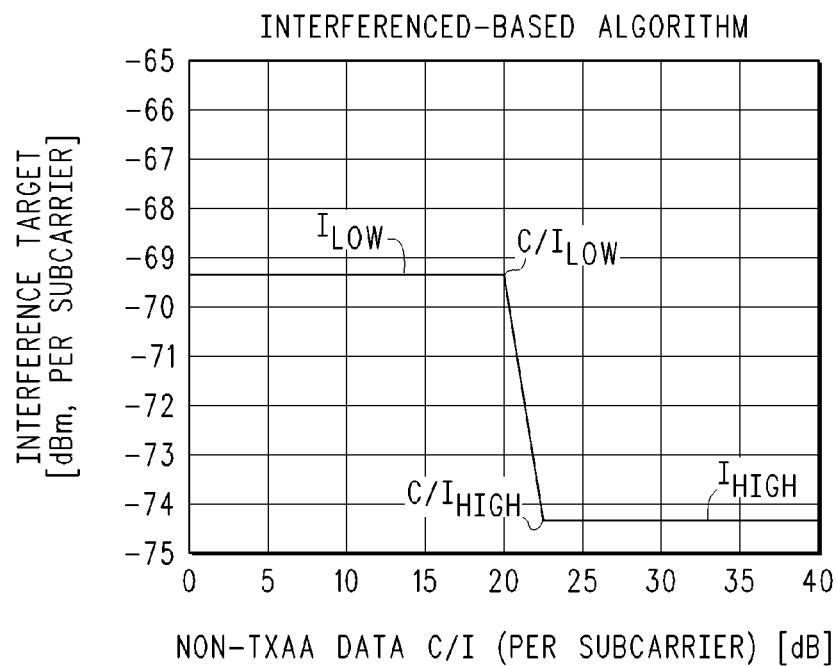
FIG. 5 is a graph showing variations in the interference target power level versus non-beamformed C/I data, according to an embodiment of the present invention.

Here, $I_{Target}$ is the target per subcarrier interference power (in dBm) at the ADC 104 input, $I_{Low}$ is the target interference value (in dBm) when C/I is below a designated low value, $I_{High}$ is the target interference value (in dBm) when C/I is above a designated high value, $(C/I)_{Low}$ is a threshold value which defines the region of low C/I (in dB), $(C/I)_{High}$ is a threshold which defines the region of high C/I (in dB), and $$m_I = \frac{I_{High} - I_{Low}}{(C/I)_{High} - (C/I)_{Low}}$$

is the slope of the transition region between $(C/I)_{Low}$ and $(C/I)_{High}$ (in dB/dB). A plot of the interference target power level is shown in FIG. 5 for $(C/I)_{Low}$=20 dB, $(C/I)_{High}$=22.5 dB, $I_{Low}$=−69.3 dBm, and $I_{High}$=−74.3 dBm ($m_I$=−2 dB/dB). Again, it is desirable that the target be a continuous function of C/I to prevent large gain changes from frame to frame when the C/I is near the threshold.

Figure 6:
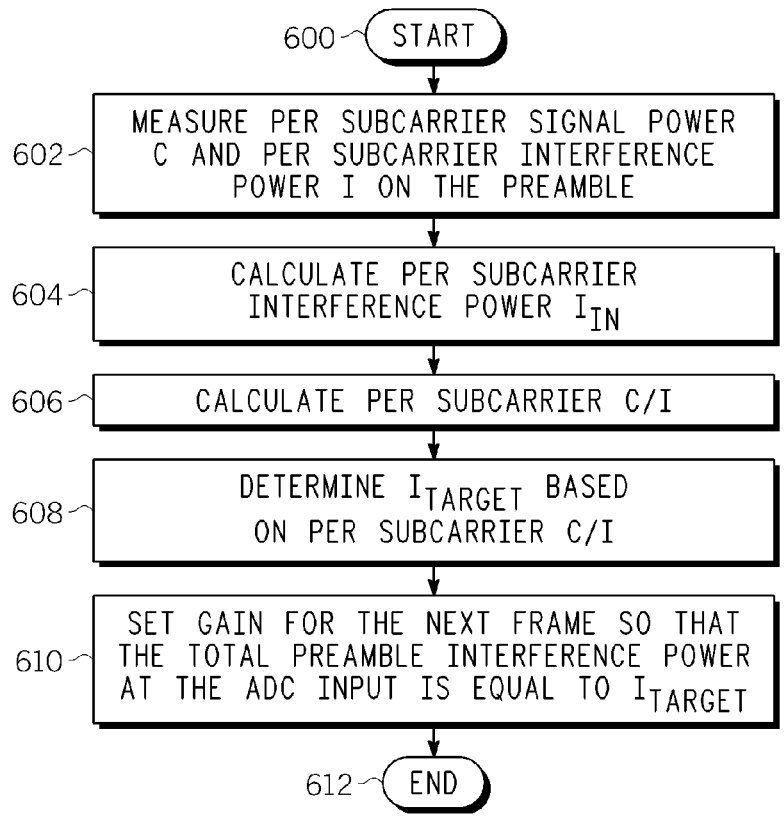
FIG. 6 is a process flow diagram illustrating steps in the interference-based AGC method used for each subframe, according to an embodiment of the present invention.
Figure 12:
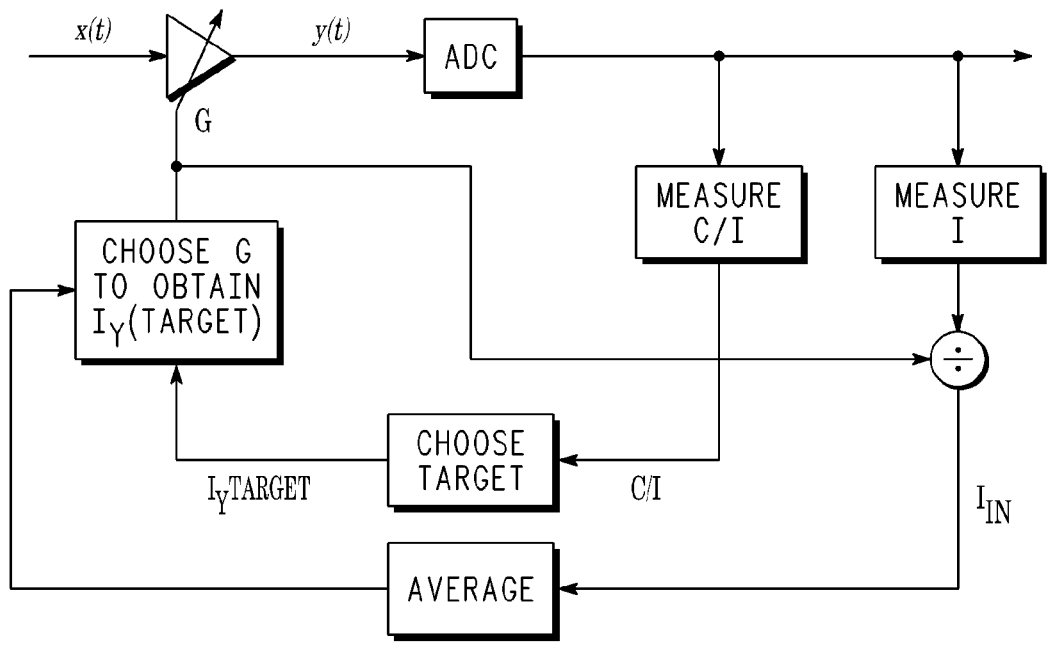
FIG. 12 is a partial block schematic diagram illustrating an interference-based AGC process flow.

FIGS. 6 and 12 show a process flow of the interference-based AGC method used for each subframe. The flow begins at step 600 and moves directly to step 602, where the per subcarrier signal power C and per subcarrier interference power I on the preamble are measured at the output of the ADC 104. It should be noted that, as in the power-based approach, (C/I) can be on the data or preamble. Next, in step 604, $I_{In}$, which is the per subcarrier interference power referred to the input of the RF section 102, and equal to I/G, is calculated. Here, G is the current (linear) value of the RF gain. In one embodiment, $I_{In}$ is stored and averaged over several frames. In step 606, the per subcarrier C/I corresponding to the non-beamformed data at the output of the ADC 104 is calculated. This value may be stored and averaged over several frames. Next, in step 608, the target interference value, $I_{Target}$, based on the (average) per subcarrier C/I, is determined using, for example, the formula for $I_{Target}$ above. In step 610, the gain for the next frame is set so that the total interference power on the preamble at the ADC 104 output is equal to $I_{Target}$. In other words, the gain $G_{dB}$ in dB is found so that $I_{dBm}+G_{dB}=I_{Target}$, where $I_{dBm}$ is $I_{In}$ (averaged) expressed in dBm. The flow ends at step 612.

Equivalent Algorithms

Figure 7:
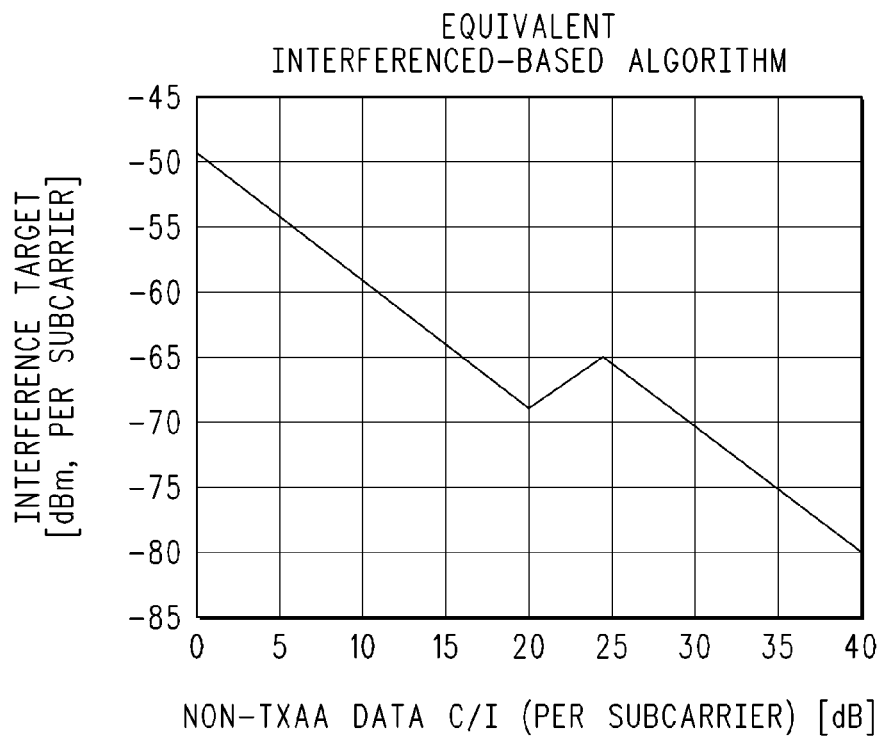
FIG. 7 is a graph of an interference-based target using the same parameters used in the power-based AGC shown in FIG. 3, according to an embodiment of the present invention.

When there is a known relationship between the total preamble power at the ADC 104 input and the per subcarrier signal power on non-beamformed data, each of the above algorithms has an equivalent algorithm of the other type. For example, the equivalent interference-based target for the power-based AGC target given in the formula for $S_{Target}$ above is $$I_{Target(eq)} = S_{Target} = (S_{Preamble}/C_{Data}) - (C/I),$$

where $(S_{Preamble}/C_{Data})$ is the ratio between the total average preamble power and the per subcarrier power on a non-beamformed data subcarrier (in dB). In IEEE 802.16, this ratio is given by $$(S_{Preamble}/C_{Data}) = B_{Preamble} + 10 \log_{10} K_{Preamble},$$

where $K_{Preamble}$ is the number of occupied preamble subcarriers. Using the same parameters given above for the power-based AGC in FIG. 3, the equivalent interference-based target is shown in FIG. 7. Similarly, the equivalent power-based target for the interference-based AGC target given in the formula for $I_{Target}$ above is $$S_{Target(eq)} = I_{Target} + (S_{Preamble}/C_{Data}) + (C/I).$$

Figure 8:
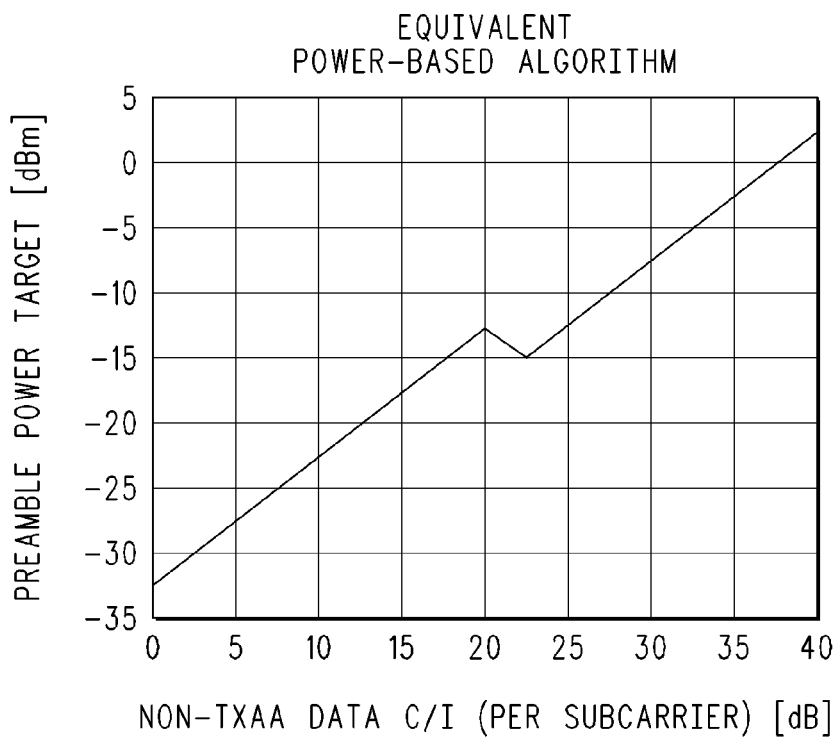
FIG. 8 is a graph of a power-based target using the same parameters used in the interference-based AGC shown in FIG. 5, according to an embodiment of the present invention.

Using the same parameters given above for the interference-based AGC in FIG. 5, the equivalent power-based target is shown in FIG. 8. In both of these cases, $K_{Preamble}$=568 and the powers shown apply at the output of the ADC 104 referred back to its input.

Figure 9:
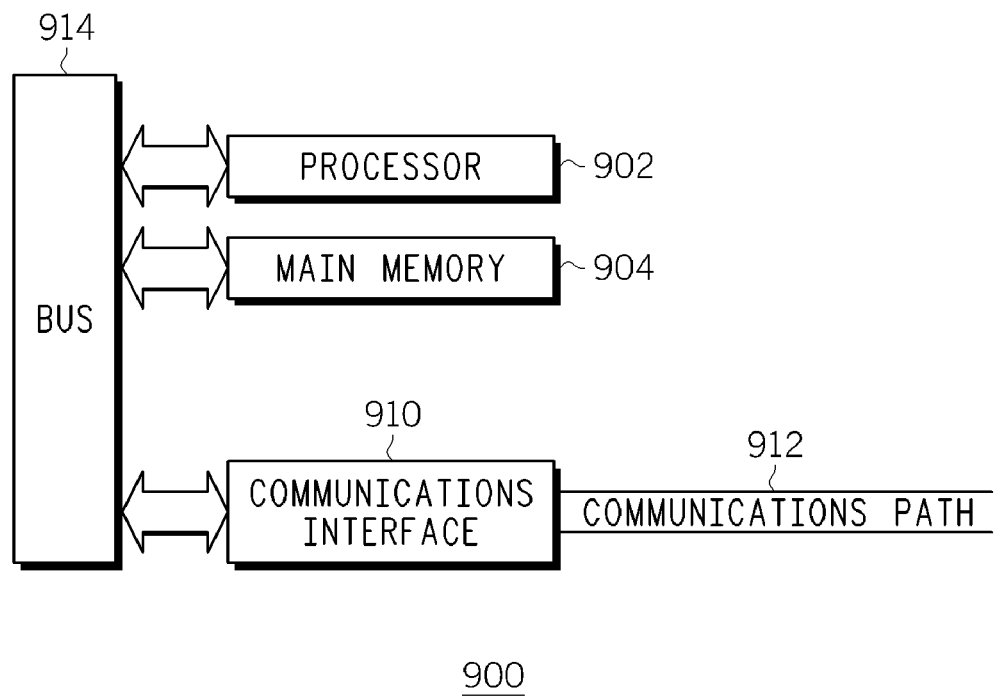
FIG. 9 is a high level block circuit diagram illustrating a detailed view of a computing system, according to an embodiment of the present invention.
Figure 10:
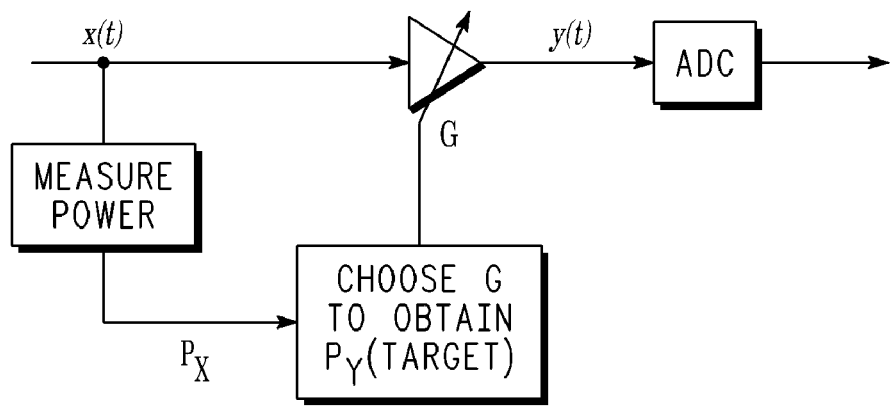
FIG. 10 is a partial block schematic diagram illustrating a conventional AGC process flow.

FIG. 9 is a high level block circuit diagram illustrating a detailed view of a computing system 900 useful for determining and setting the gain of the automatic gain control amplifier portion 108 according to embodiments of the present invention. The computing system 900 is based upon a suitably configured processing system adapted to implement an exemplary embodiment of the present invention. The computing system 900 can be a subsystem of one or both of the chipsets of FIG. 1 or can be a separate system in communication with the components of FIG. 1.

In one embodiment of the present invention, the AGC 108 includes or is communicatively coupled with one or more processors, such as processor 902. The processor 902 is connected to a communication infrastructure 914 (e.g., a communications bus). Various software embodiments are described in terms of this exemplary computer system. After reading this description, it will become apparent to a person of ordinary skill in the relevant art(s) how to implement the invention using other computer systems and/or computer architectures.

The computing system 900 also includes a memory 904, preferably random access memory (RAM), and may also include various caches and auxiliary memory as are normally found in computer systems. The memory 904 is useful for, for example, storing values for use in averaging functions.

The computing system 900, in this example, includes a communications interface 910 that acts as an input and output and allows software and data to be transferred. Software and data transferred via communications interface 910 are in the form of signals which may be, for example, electronic, electromagnetic, optical, or other signals capable of being received by communications interface 910. The signals are provided to communications interface 910 via a communications path (i.e., channel) 912. The channel 912 carries signals and may be implemented using wire or cable, fiber optics, a phone line, a cellular phone link, an RF link, and/or other communications channels.

Computer programs (also called computer control logic) are stored in memory 904. Computer programs may also be received via communications interface 910. Such computer programs, when executed, enable the computer system to perform the features of the present invention as discussed herein. In particular, the computer programs, when executed, enable the processor 902 to perform the features of the computer system.

An implementation of the invention can be entirely done within the hardware of FIG. 1 (though it need not be as long as the timing requirements can be met). For example, the chipset 106 implements (in hardware) the algorithm which measures C and I at the ADC output and then chooses the target based on these measurements. It communicates the target to the RF chipset 102. Only parameters like (C/I)high, (C/I)$_{low}$, S$_{high}$, S$_{high}$, and M$_p$ need to come from a system outside FIG. 1 (but they could conceivably be fixed). On the other hand, the target choice could be implemented in software in some implementation. Software-defined radio is one case where this might occur. In that case, it is possible that a large portion of 106 might be implemented in software.

Conclusion

As should now be clear, embodiments of the present invention provide a novel and efficient AGC approach. The modified approach uses (but is not limited to) a single gain across the received frame and targets either the total received power or the per subcarrier interference power. In both cases, the target varies as a function of the C/I measured at the receiver. With either approach, it is assumed that TxAA will not be directed toward the receiver when its C/I is large. Both the power-based approach and the interference-based approaches are able to handle TxAA data without the need to significantly expand the linearity requirements of the RF section or to significantly increase the resolution of the ADC 104 over that which is required in a non-beamformed environment. The new AGC method advantageously varies from the prior art by setting the target as a function of the measured C/I thereby allowing the RF section to operate linearly on the TxAA data and avoiding added dynamic range requirements for the data converter.

NON-LIMITING EXAMPLES

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method of selecting an RF gain of an automatic gain control amplifier, the method comprising:
   measuring a strength of a received signal, the received signal at least at times having reliable and consistent power characteristics;
   measuring an interference level of the received signal; and
   based on a ratio of the measured signal strength to the measured interference level, determining one of:
      a target output power level; and
      a target output interference power level; and
   determining a gain that, when applied to an incoming signal, will produce a corresponding one of:
      the determined target output power level; and
      the determined target output interference power level.

2. The method according to claim 1, wherein the target output power level determining step comprises:
   setting the target output power level to a first value when the measured signal strength divided by the measured interference level falls below a first threshold value; and
   setting the target output power level to a second value when the measured signal strength divided by the measured interference level exceeds a second threshold value, wherein the first value is less than the second value.

3. The method according to claim 2, further comprising:
   determining a continuous transition between the first value and the second value.

4. The method according to claim 3, which further comprises:
   determining the transition by the formula $(S_{High}-S_{Low})/((C/I)_{High}-(C/I)_{Low})$, where $S_{High}$ is the target output power level when the ratio of the measured signal strength to the measured interference level exceeds the second threshold value, $S_{Low}$ is the target output power level when the ratio of the measured signal strength to the measured interference level is less than the first threshold value, $(C/I)_{High}$ being the second threshold value, and $(C/I)_{Low}$ being the first threshold value.

5. The method according to claim 1, wherein the target interference output power level determining step comprises:
   setting the target interference output power level to a first value when the measured signal strength divided by the measured interference level falls below a first threshold value; and
   setting the target interference output power level to a second value when the measured signal strength divided by the measured interference level exceeds a second threshold value, wherein the first value is less than the second value.

6. The method according to claim 5, further comprising:
determining a continuous transition between the first value and the second value.

7. The method according to claim 6, which further comprises:
determining the transition slope by the formula $(I_{High}-I_{Low})/((C/I)_{High}-(C/I)_{Low})$, where $I_{High}$ is the target interference power output level when the ratio of the measured signal strength to the measured interference level exceeds the second threshold value, $I_{Low}$ is the target interference power output level when the ratio of the measured signal strength to the measured interference level is less than the first threshold value, $(C/I)_{High}$ being the second threshold value, and $(C/I)_{Low}$ being the first threshold value.

8. The method according to claim 1, which further comprises:
providing the automatic gain control amplifier with:
an RF receiver;
an analog-to-digital converter communicatively coupled with and disposed downstream from the RF receiver; and
a digital receiver communicatively coupled with and disposed downstream from the analog-to-digital converter;
measuring the signal strength at an output of the analog-to-digital converter; and
measuring the interference level at the output of the analog-to-digital converter.

9. A communication device including an automatic gain control system comprising:
an RF receiver;
an analog-to-digital converter communicatively coupled with and disposed downstream from the RF receiver;
a digital receiver communicatively coupled with and disposed downstream from the analog-to-digital converter;
a first meter operable to measure a strength of a received signal, the signal having reliable and consistent power characteristics;
a second meter located downstream from the analog-to-digital converter and operable to measure an interference level of the received signal; and
a processor operable to:
based on a ratio of the measured signal strength of the signal to the measured interference level, determine one of:
a target output power level; and
a target output interference power level; and
determine a gain that, when applied to an incoming signal, will produce a corresponding one of:
the determined target output power level; and
the determined target output interference power level.

10. The communication device according to claim 9, wherein the processor is further operable to:
set the target output power level to a first value when the measured signal strength divided by the measured interference level falls below a first threshold value; and
set the target output power level to a second value when the measured signal strength divided by the measured interference level exceeds a second threshold value, wherein the first value is less than the second value.

11. The communication device according to claim 10, wherein the processor is further operable to:
determine a continuous transition between the first value and the second value.

12. The communication device according to claim 11, wherein the processor is further operable to:
determine the transition slope by the formula $(S_{High}-S_{Low})/((C/I)_{High}-(C/I)_{Low})$, where $S_{High}$ is the target output power level when the ratio of the measured signal strength to the measured interference level exceeds the first threshold value, $S_{Low}$ is the target output power level when the ratio of the measured signal strength to the measured interference level is less than the second threshold value, $(C/I)_{High}$ is the first threshold value, and $(C/I)_{Low}$ is the second threshold value.

13. The communication device according to claim 9, wherein the processor is further operable to:
set the target interference output power level to a first value when the measured signal strength divided by the measured interference level falls below a first threshold value; and
set the target interference output power level to a second value when the measured signal strength divided by the measured interference level exceeds a second threshold value, wherein the first value is greater than the second value.

14. The communication device according to claim 9, wherein the processor is further operable to:
determine a continuous transition between the first value and the second value.

15. The communication device according to claim 9, wherein the processor is further operable to:
determine the transition slope by the formula $(I_{High}-I_{Low})/((C/I)_{High}-(C/I)_{Low})$, where $I_{High}$ is the target interference power output level when the ratio of the measured signal strength to the measured interference level exceeds the second threshold value, $I_{Low}$ is the target interference power output level when the ratio of the measured signal strength to the measured interference level is less than the first threshold value, $(C/I)_{High}$ being the second threshold value, and $(C/I)_{Low}$ being the first threshold value.

16. The communication device according to claim 9, wherein:
the interference level is measured at an output of the analog to digital converter.

17. A method of selecting an RF gain of an automatic gain control amplifier, the method comprising:
measuring a signal strength of a received preamble;
measuring an interference level of the received preamble; and
selecting an automatic gain control amplifier gain based on a ratio of the measured signal strength to the measured interference level;
wherein the gain selecting step comprises:
determining a target output power level based on the ratio of the measured signal strength to the measured interference level, and
determining a gain that, when applied to an incoming signal, will produce the target output power level; and
wherein the target determining step comprises:
setting a target to a first target value when the measured signal strength divided by the measured interference level falls below a first threshold value; and
setting the target to a second target value when the measured signal strength divided by the measured interference level exceeds a second threshold value, wherein the first target value is less than the second target value.

18. The method according to claim 17, further comprising:
determining a continuous transition between the first target value and the second target value.

* * * * *